(12) United States Patent
Ruthmann et al.

(10) Patent No.: US 9,120,400 B2
(45) Date of Patent: Sep. 1, 2015

(54) POSITIVELY ENGAGED LOCKING MECHANISM FOR A VEHICLE SEAT

(71) Applicant: Lear Corporation, Southfield, MI (US)

(72) Inventors: Christian Ruthmann, Herzebrock-Clarholz (DE); Hans-Peter Mischer, Bad Meinberg (DE); Michael Wojatzki, Ennigerloh (DE)

(73) Assignee: Lear Corporation, Southfield, MI (US)

( * ) Notice: Subject to any disclaimer, the term of this patent is extended or adjusted under 35 U.S.C. 154(b) by 222 days.

(21) Appl. No.: 13/705,854

(22) Filed: Dec. 5, 2012

(65) Prior Publication Data

US 2013/0153735 A1  Jun. 20, 2013

(30) Foreign Application Priority Data

Dec. 16, 2011 (DE) .......................... 10 2011 088 878

(51) Int. Cl.
*B60N 2/07* (2006.01)
*B60N 2/08* (2006.01)

(52) U.S. Cl.
CPC ............ *B60N 2/0806* (2013.01); *B60N 2/0705* (2013.01); *B60N 2/0715* (2013.01); *B60N 2/0818* (2013.01); *B60N 2/0868* (2013.01)

(58) Field of Classification Search
USPC ................. 248/424, 425, 429, 430, 423, 420; 297/344.1, 318, 341
See application file for complete search history.

(56) References Cited

U.S. PATENT DOCUMENTS

| | | | |
|---|---|---|---|
| 4,209,159 A * | 6/1980 | Becker et al. ................. | 248/430 |
| 5,772,173 A * | 6/1998 | Couasnon ..................... | 248/430 |
| 6,322,036 B1 | 11/2001 | Tame et al. | |
| 6,354,553 B1 | 3/2002 | Lagerweij et al. | |
| 6,688,574 B2 * | 2/2004 | Okazaki et al. ................ | 248/424 |
| 6,764,054 B2 | 7/2004 | Becker et al. | |
| 6,874,747 B2 * | 4/2005 | Oh ................. | 248/430 |
| 6,981,681 B2 | 1/2006 | Matsumoto | |
| 7,191,995 B2 * | 3/2007 | Kim ............................. | 248/429 |
| 7,207,541 B2 | 4/2007 | Frohnhaus et al. | |

(Continued)

FOREIGN PATENT DOCUMENTS

| | | |
|---|---|---|
| FR | 2919234 A1 | 1/2009 |
| WO | 2005021319 A2 | 3/2005 |

(Continued)

OTHER PUBLICATIONS

German Office Action, Application No. DE 102011088878.0, dated Jul. 26, 2012.

*Primary Examiner* — Nkeisha Smith
(74) *Attorney, Agent, or Firm* — MacMillan, Sobanski & Todd, LLC

(57) ABSTRACT

A seat track assembly includes a first track having a wall including a plurality of openings formed therein. A second track is slidably mounted relative to the first track and has a pair of spaced apart walls, each of the walls include a plurality of openings formed therein. The seat track assembly further includes a locking mechanism that includes a pin carried by the second track and slidably movable within a substantially horizontal plane between an engaged position and a disengaged position. In the engaged position, the pin is disposed in one of the plurality of openings formed in the wall of the first track and is pivoted to a position such that an axis of the pin is not parallel with the substantially horizontal plane. In the disengaged position, the pin is not disposed in the opening formed in the wall of the first track.

21 Claims, 11 Drawing Sheets

(56) References Cited

U.S. PATENT DOCUMENTS

| | | | |
|---|---|---|---|
| 7,328,877 B2* | 2/2008 | Yamada et al. | 248/430 |
| 7,669,825 B2* | 3/2010 | Sung | 248/429 |
| 7,758,008 B2* | 7/2010 | Kojima et al. | 248/430 |
| 7,780,138 B1* | 8/2010 | Lee et al. | 248/429 |
| 8,308,120 B2* | 11/2012 | Zacharias et al. | 248/429 |
| 8,550,420 B2* | 10/2013 | Wojatzki et al. | 248/429 |
| 8,573,698 B2* | 11/2013 | Wojatzki et al. | 297/344.1 |
| 2004/0217251 A1* | 11/2004 | Leguede et al. | 248/424 |
| 2004/0238712 A1* | 12/2004 | Oh | 248/430 |
| 2006/0131470 A1* | 6/2006 | Yamada et al. | 248/424 |
| 2006/0261237 A1* | 11/2006 | Noffz | 248/424 |
| 2007/0090262 A1* | 4/2007 | Sung | 248/429 |
| 2008/0163717 A1* | 7/2008 | Weber | 74/527 |
| 2009/0114793 A1* | 5/2009 | Brewer et al. | 248/429 |
| 2010/0181460 A1* | 7/2010 | Park et al. | 248/429 |
| 2011/0193389 A1* | 8/2011 | Wojatzki et al. | 297/344.1 |
| 2012/0074287 A1* | 3/2012 | Wojatzki et al. | 248/429 |

FOREIGN PATENT DOCUMENTS

| | | |
|---|---|---|
| WO | 2006053145 A1 | 5/2006 |
| WO | 2010080601 A1 | 7/2010 |
| WO | 2011123091 A1 | 10/2011 |

* cited by examiner

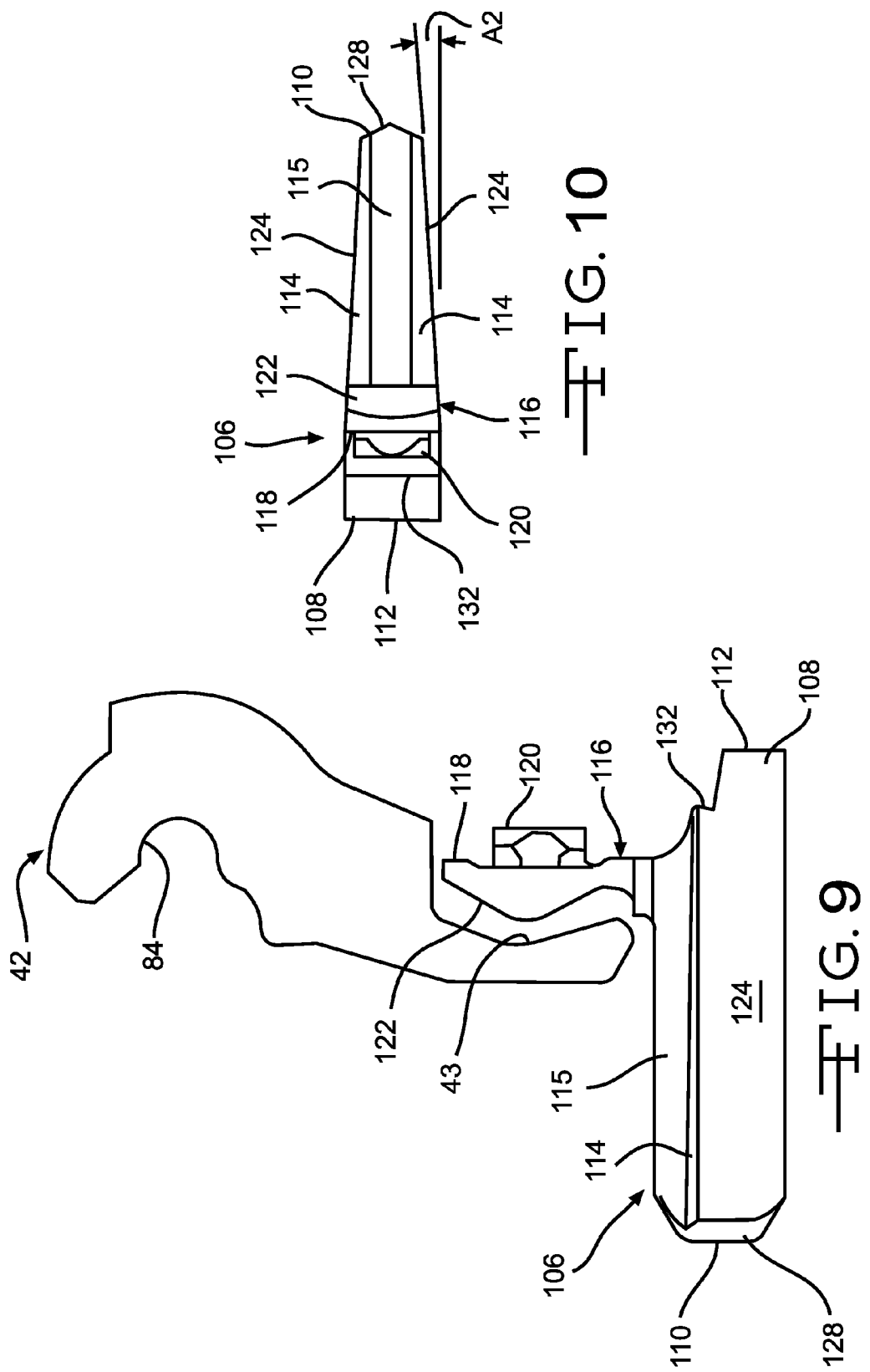

POSITIVELY ENGAGED LOCKING MECHANISM FOR A VEHICLE SEAT

BACKGROUND

Various embodiments of a seat track assembly are described herein. In particular, the embodiments described herein relate to an improved positively engaged locking (PEL) mechanism for a vehicle.

Vehicles commonly include seats that are movably mounted on a vehicle floor to provide an adjustable position of the seat relative to the vehicle floor in fore and aft directions. For example, the occupant of the driver's seat may want to adjust his or her position relative to the steering wheel, brake, and accelerator pedals. The vehicle seat may be mounted on tracks for slidably moving the seat in the fore and aft directions along the vehicle floor. Commonly, a pair of track assemblies is mounted between the vehicle floor and the seat bottom. One track assembly is generally mounted on the inboard side of the seat, and the other track assembly is generally mounted on the outboard side of the seat. A typical track assembly includes a lower track bolted to the vehicle floor. An upper track is mounted on the seat. The upper track is slidably mounted on the lower track. Ball or roller bearings are commonly provided between portions of the tracks for ease of moving the upper track relative to the lower track.

Seat track assemblies may include a locking assembly that prevents the tracks from moving relative to one another during normal use of the seat. When the user wants to move the seat position, the user actuates the locking assembly to an unlatched position, thereby permitting the seat to be moved to a desired position. After the seat is in its desired position, the user then moves the locking assembly to a latched position, thereby preventing the seat from moving relative to the floor.

Known locking assemblies include one or more locking pins that move substantially vertically or substantially horizontally relative to the seat track assembly. U.S. Pat. Nos. 6,874,747 and 7,191,995 illustrate examples of known track assemblies. The track assemblies include locking pins that move substantially horizontally into and out of openings formed in the tracks between locked and unlocked positions. U.S. Pat. No. 6,637,712 illustrates an example of a known track assembly that uses pins slidably mounted in a vertical orientation, wherein the pins extend underneath the tracks when in their locked position. U.S. Pat. No. 7,207,541 discloses a seat track locking device with pins 40 having a circumferential groove 50. The pins 40 extend into bores 38 having annular projections 54. During a crash, the pins 40 bend at the groove 50 and the projections 54 bend radially outwardly. The grooves 50 of the pins 40 engage the bent projections 54 of the bores 38, thus preventing the pins 40 from bouncing upwardly and out of the locked position.

The above notwithstanding, there remains a need for an improved seat track assembly that prevents the tracks from moving relative to one another during normal use of the seat and during an impact or crash event.

SUMMARY

This application describes various embodiments of a vehicle seat track assembly. One embodiment of the vehicle seat track assembly includes a first track having a wall including a plurality of openings formed therein. A second track is slidably mounted relative to the first track and has a pair of spaced apart walls, each of the walls include a plurality of openings formed therein. The seat track assembly further includes a locking mechanism that includes a pin carried by the second track and slidably movable within a substantially horizontal plane between an engaged position and a disengaged position. In the engaged position, the pin is disposed in one of the plurality of openings formed in the wall of the first track and is pivoted to a position such that an axis of the pin is not parallel with the substantially horizontal plane. In the disengaged position, the pin is not disposed in the opening formed in the wall of the first track.

Various advantages of the vehicle seat track assembly will become apparent to those skilled in the art from the following detailed description, when read in light of the accompanying drawings.

BRIEF DESCRIPTION OF THE DRAWINGS

FIG. 9 is an enlarged side elevational view of a pin and an actuator shown in FIGS. 4 through 7.

FIG. 10 is a top plan view of the pin shown in FIG. 9.

DETAILED DESCRIPTION

Figure 1:
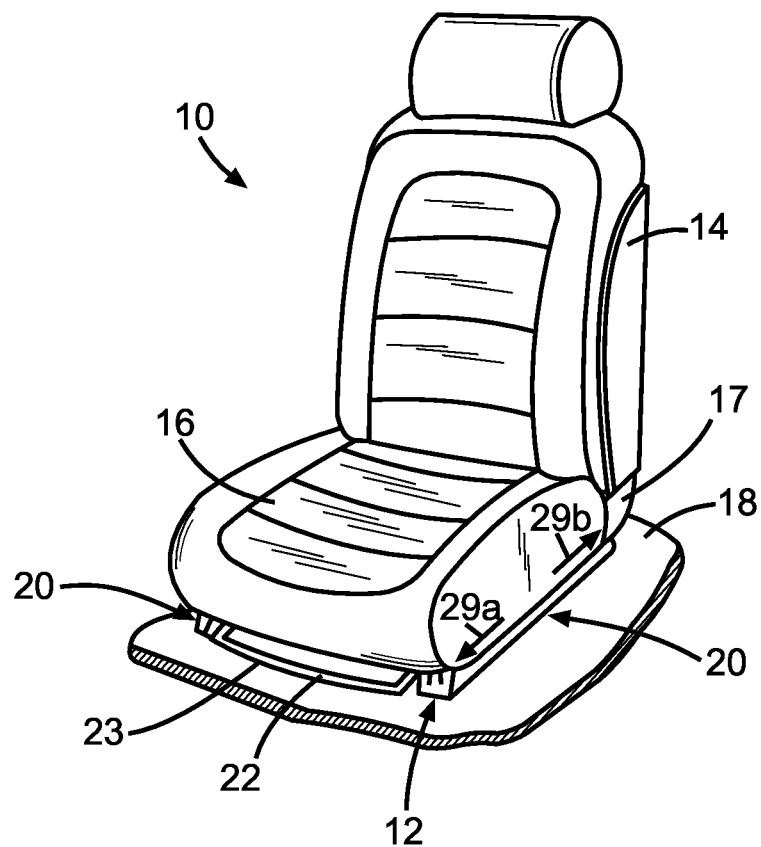
FIG. 1 is a perspective view of a vehicle seat including a seat mounting assembly according to the invention.

Referring now to the drawings, there is illustrated in FIG. 1 a vehicle seat 10. The vehicle seat 10 includes a seat mounting assembly 12. The vehicle seat 10 may be any conventional seat design and may include a seat back 14 and a seat bottom 16. The seat back 14 may be pivotally mounted on the seat bottom 16 via a recliner mechanism 17 such that the seat back 14 may be positioned at selected recline angles relative to the seat bottom 16. The seat mounting assembly 12 is attached to an underside of the seat bottom 16 and is configured to be mounted on a vehicle floor 18.

The seat mounting assembly 12 generally includes a pair of seat track assemblies, each indicated generally at 20, and a release handle 22, commonly referred to in the industry as a towel bar. The release handle 22 is generally U-shaped and includes a grasping portion 23. The seat track assemblies 20 are mounted on each side of the vehicle seat 10, as shown in FIG. 1. The seat track assemblies 20 permit selective sliding movement of the vehicle seat 10 relative to the floor 18 in a longitudinal direction. More specifically, the vehicle seat 10 may travel in a forward or fore direction 29a and a rearward or aft direction 29b. As will be discussed below, the seat mounting assembly 12 may be operated via the release handle 22 between a locked position, wherein the seat 10 is prevented from moving relative to the floor 18, and an unlocked position, wherein the seat 10 may be moved in the fore and aft directions 29a and 29b relative to the vehicle floor 18.

Figure 2:
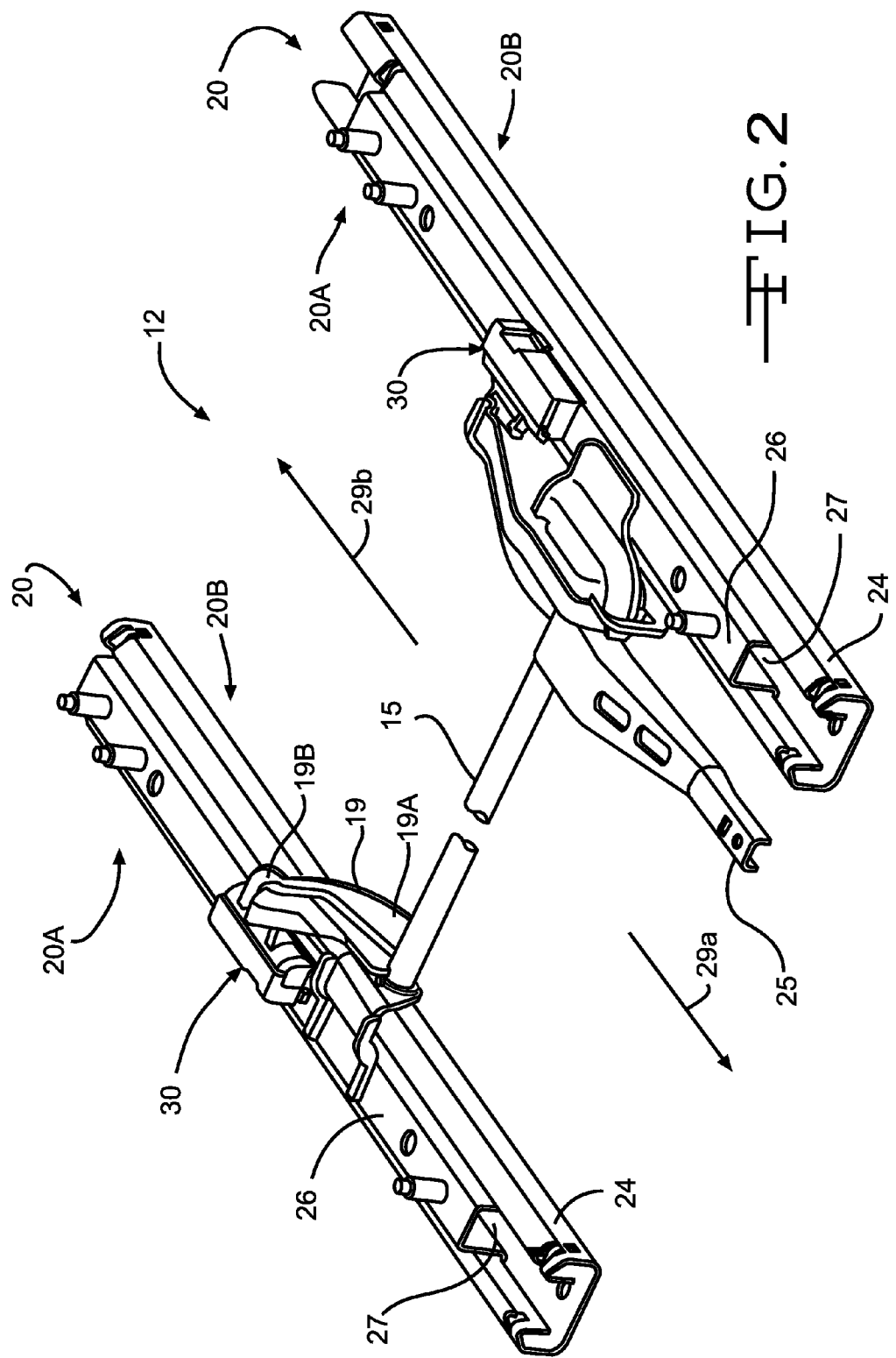
FIG. 2 is an enlarged perspective view of a first embodiment of the seat mounting assembly illustrated in FIG. 1.

Referring now to FIG. 2, each of the illustrated seat track assemblies 20 has a first or free play elimination pin side 20A and a second or locking pin side 20B, and each includes a first or lower rail or track 24 and a second or upper rail or track 26. The lower and upper tracks 24 and 26 are slidably mounted relative to one another. The tracks 24 and 26 are generally elongated in shape and are arranged such they extend in the fore and aft directions 29a and 29b, respectively. The lower track 24 may be attached to the vehicle floor 18, such as with bolts or other fasteners. The upper track 26 may be attached to the seat bottom 16, such as on its underside. As will be described below, the lower and upper tracks 24 and 26 are configured to accept bearings or other structures disposed between them for supporting the tracks 24 and 26 together. The bearings also provide for a relatively low friction sliding motion between the tracks 24 and 26. The lower track 24 has a generally U-shaped cross section. The upper track 26 has an inverted generally U-shaped cross section. When connected together, an interior space or cavity 27 is defined between the tracks 24 and 26. The tracks 24 and 26 may be made of any suitable material, such as metal, and may be formed by any suitable manner, such as by stamping.

At least one of the seat track assemblies 20 includes a locking mechanism. In the illustrated embodiment, the locking mechanism is a positively engaged locking (PEL) mechanism 30.

Figure 3:
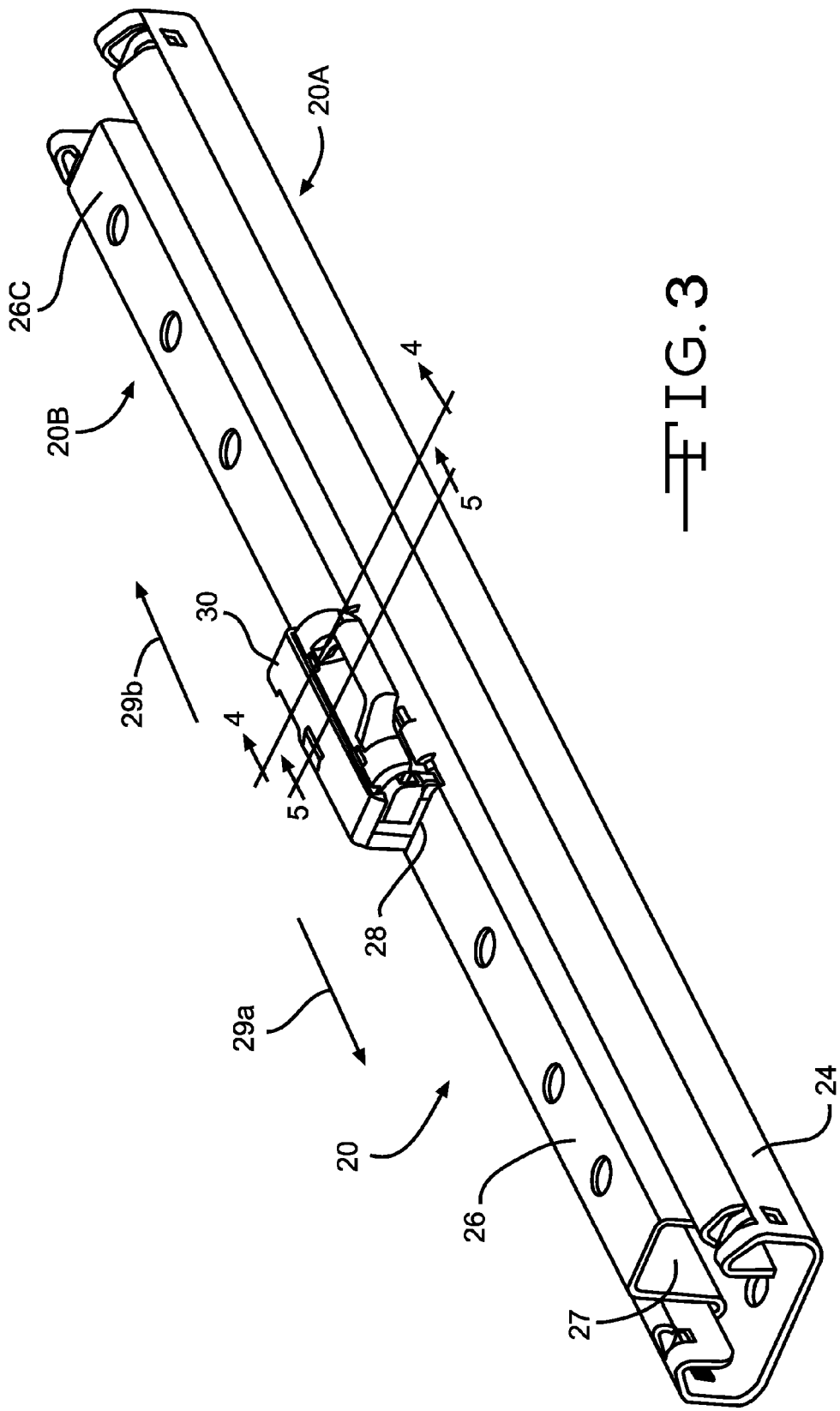
FIG. 3 is an enlarged perspective view of one of the seat track assemblies illustrated in FIG. 2.

The seat mounting assembly 12 may have a PEL mechanism 30 for each seat track assembly 20 or may have a single PEL mechanism 30 for only one of the two seat track assemblies 20. For simplicity, only one of the seat track assemblies 20, as shown in FIG. 3, will be described herein, but it should be understood that the other seat track assembly 20 may also be configured in a similar manner.

The seat mounting assembly 12 includes a pivot/mounting rod 15 attached to the PEL mechanism 30. In an embodiment of the seat mounting assembly 12 wherein each seat track assembly 20 includes a PEL mechanism 30, the pivot/mounting rod 15 is attached between the PEL mechanisms 30 of opposing seat track assemblies 20. A release handle portion 25 extends forwardly from the pivot/mounting rod 15 and is connected to the release handle 22. A release arm 19 extends rearwardly from the pivot/mounting rod 15. The release arm 19 includes a first or forward end 19A attached to the pivot/mounting rod 15, and a second or rearwardly facing end 19B. The second end 19B is biased into engagement with the PEL mechanism 30. The PEL mechanism 30 is, therefore, connected to the release handle 22 and is operable by pivoting movement of the release handle 22.

Referring to FIGS. 4 through 7, additional details of the tracks 24 and 26 will now be described. The upper track 26 may be structured and configured to slide relative to the lower track 24. If desired, the upper track 26 may be structured and configured to slide relative to the lower track 24 with the assistance of multiple balls or rollers (not shown) disposed between the tracks 24 and 26 in a space S. The tracks 24 and 26 may have any suitable construction. On the free play elimination pin side 20A of the seat track assembly 20, the upper track 26 includes a first wall 26A1 and a second wall 26B1. On the locking pin side 20B of the seat track assembly 20, the upper track 26 includes a first wall 26A2 and a second wall 26B2. The first walls 26A1 and 26A2 extend downwardly from lateral edges of a top plate 26C. The second walls 26B1 and 26B2 have a substantially serpentine cross-sectional shape and extend upwardly from lower ends of the walls 26A1 and 26A2, respectively.

Figure 4:
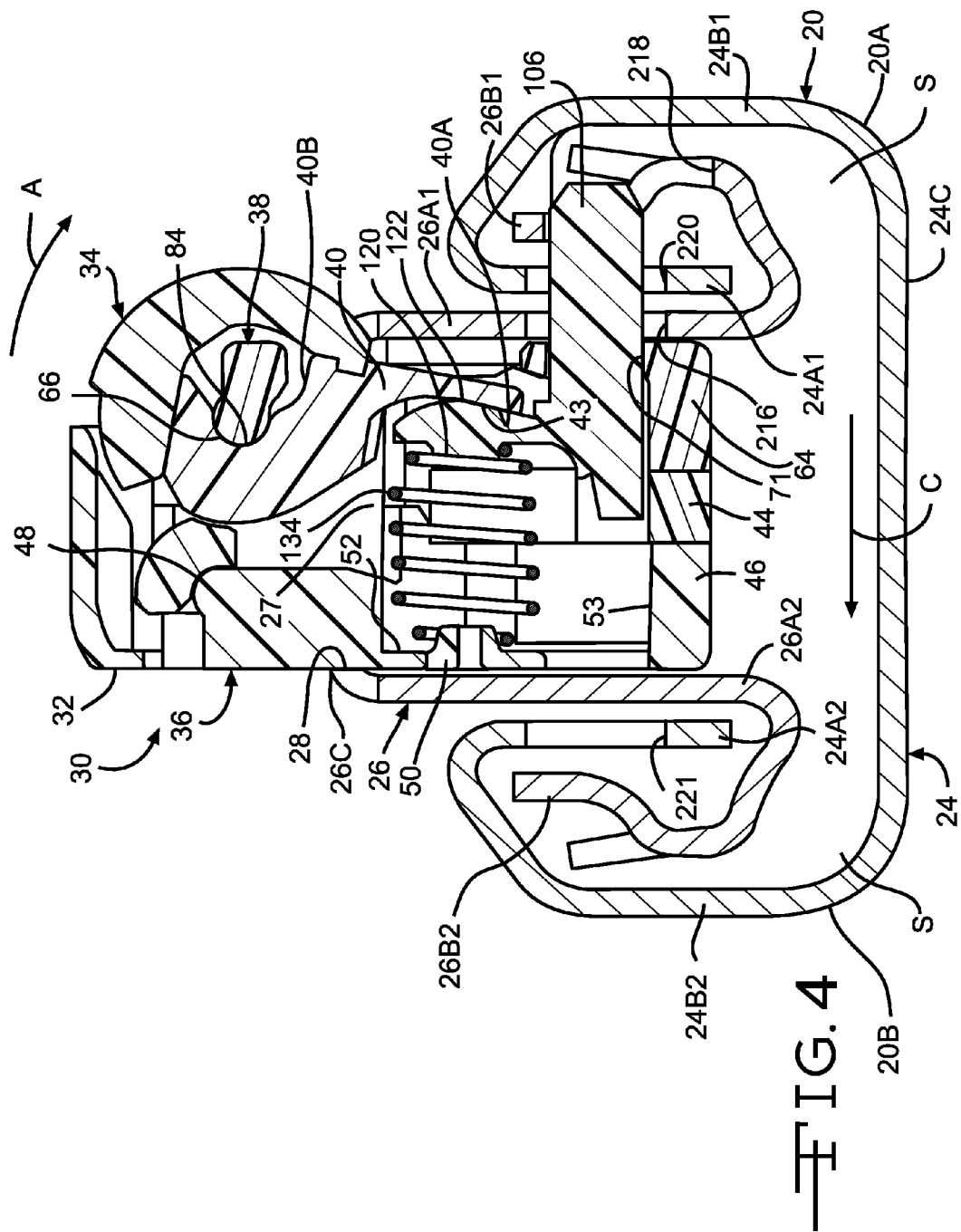
FIG. 4 is a cross sectional view taken along the line 4-4 of FIG. 3.
Figure 7:
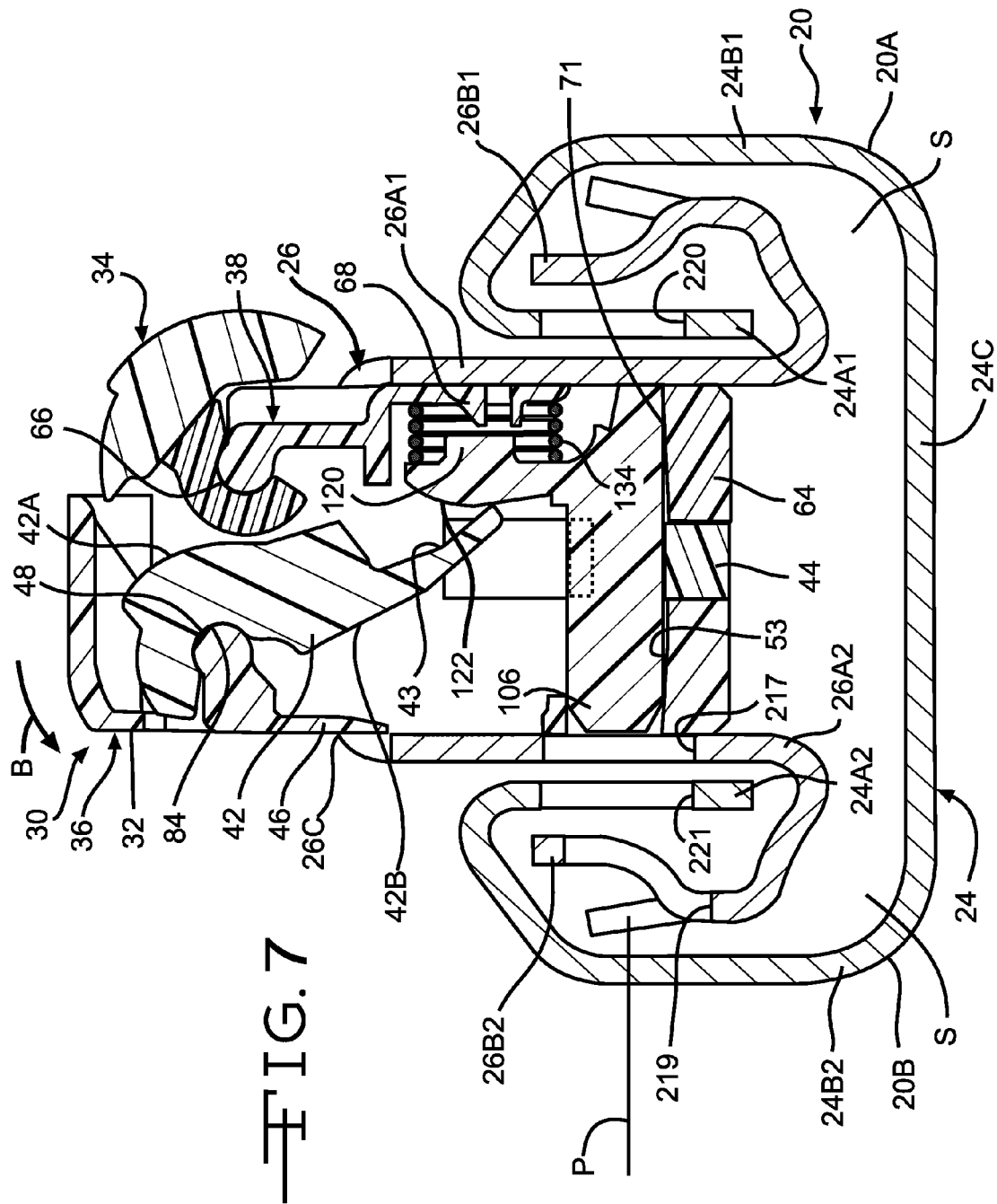
FIG. 7 is a cross sectional view similar to FIG. 5 showing the PEL in a disengaged position.
Figure 8:
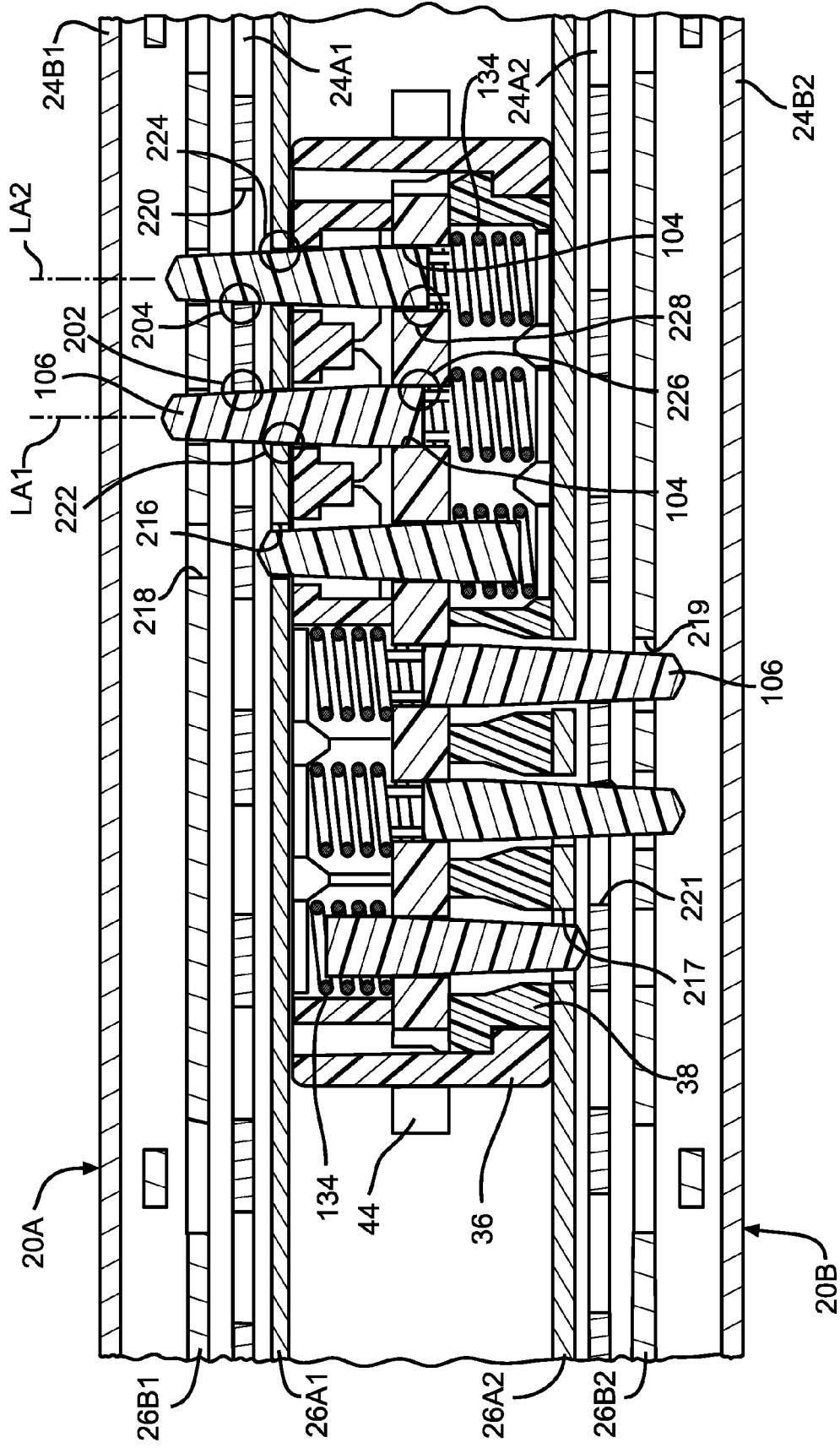
FIG. 8 is a cross sectional view taken along the line 8-8 of FIG. 5.

The lower track 24 includes first and second pluralities of openings 220 and 221 formed therein (see FIGS. 4 through 8), the reasons for which will be explained in detail below. The plurality of openings 220 and 221 are spaced from one another and positioned along the length of the lower track 24. As shown in FIGS. 4 and 8, the upper track 26 includes a plurality of first openings 216 formed in the first wall 26A1 and a plurality of second openings 218 formed in the second wall 26B1. The second openings 218 are horizontally aligned with the first openings 216. The openings 216 and 218 are spaced from one another along a portion of the length of the walls 26A1 and 26B1, respectively. The illustrated first openings 216 are substantially rectangular in shape, although the first openings 216 may have any other desired shape, such as a trapezoidal shape. The illustrated walls 26A1 and 26B1 have three openings formed therein. Alternatively, the upper track 26 may also have any desired number of first openings 216 and second openings 218 formed therein. In the illustrated embodiment, the first and second openings 216 and 218 are about 4.265 mm wide. Alternatively, the first and second openings 216 and 218 have a width within the range of from about 4.24 mm to about 4.29 mm. Alternatively, the first and second openings 216 and 218 may have any desired width, including widths smaller than about 4.24 mm and larger than about 4.29 mm.

The upper track 26 also includes a plurality of first openings 217 formed in the first wall 26A2, and a plurality of second openings 219 formed in the second wall 26B2. The second openings 219 are horizontally aligned with the first openings 217. The openings 217 and 219 are spaced from one another along a portion of the length of the walls 26A2 and 26B2, respectively. The illustrated first openings 217 are substantially rectangular in shape, although the first openings 217 may have any other desired shape, such as a trapezoidal shape. The illustrated walls 26A2 and 26B2 have three openings formed therein. Alternatively, the upper track 26 may also have any desired number of first openings 217 and second openings 219 formed therein. In the illustrated embodiment, the first openings 217 and the second openings 219 are about 5.05 mm wide. Alternatively, the first and second openings 217 and 219 have a width within the range of from about 5.025 mm to about 5.075 mm. Alternatively, the first and second openings 217 and 219 may have any desired width, including widths smaller than about 5.025 mm and larger than about 5.075 mm.

On the free play elimination pin side 20A of the seat track assembly 20, the lower track 24 includes a first wall 24A1 and a second wall 24B1. On the locking pin side 20B of the seat track assembly 20, the lower track 24 includes a first wall 24A2 and a second wall 24B2. The second walls 24B1 and 24B2 extend upwardly from lateral edges of a substantially planar base plate 24C. The first walls 26A1 and 26A2 are substantially parallel with the second walls 24B1 and 24B2.

Figure 5:
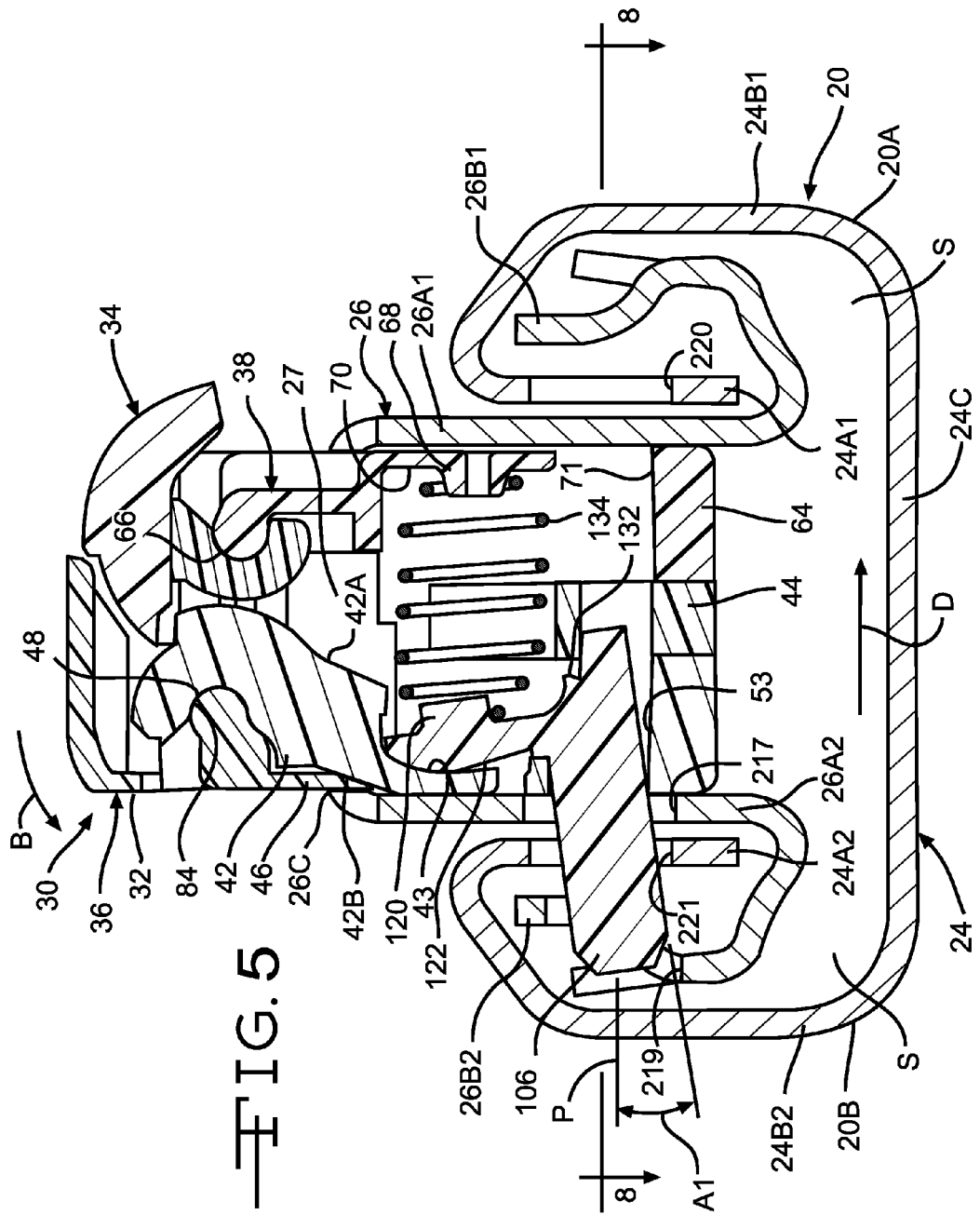
FIG. 5 is a cross sectional view taken along the line 5-5 of FIG. 3, showing the positively engaged locking (PEL) mechanism in a rotated and locked position.

In the illustrated embodiment, the lower track 24 includes a plurality of third openings 220 formed in the first wall 24A1. The lower track 24 also includes a plurality of fourth openings 221 formed in the first wall 24A2. The openings 220 are horizontally aligned with the first and second openings 216 and 218, as best shown in FIG. 4, and the openings 221 are horizontally aligned with the first and second openings 217 and 219, as best shown in FIG. 5. The wall 24A1 and 24A2 may have a relatively large number of openings 220 and 221, respectively, permitting numerous positions of the seat 10 relative to the vehicle floor 18 when the seat mounting assembly 12 is locked. The illustrated openings 220 and 221 are substantially rectangular in shape, although the openings 220 and 221 may have any other desired shape, such as a trapezoidal shape. The lower track 24 may have any desired number of third openings 220 and fourth openings 221 formed therein.

In the illustrated embodiment, the third openings 220 are about 8.2 mm wide and are spaced apart a distance of about 6.8 mm. Alternatively, the third openings 220 have a width within the range of from about 8.0 mm to about 8.4 mm and may be spaced apart a distance within the range of from about 6.775 mm to about 6.825 mm. Alternatively, the third openings 220 may have any desired width, including widths smaller than about 8.0 mm and larger than about 8.4 mm and may be spaced apart any desired distance, including distances smaller than about 6.775 mm and larger than about 6.825 mm.

In the illustrated embodiment, the fourth openings 221 are about 8.7 mm wide and are spaced apart a distance of about 6.3 mm. Alternatively, the fourth openings 221 have a width within the range of from about 8.5 mm to about 8.9 mm and may be spaced apart a distance within the range of from about 6.275 mm to about 6.325 mm. Alternatively, the fourth openings 221 may have any desired width, including widths smaller than about 8.5 mm and larger than about 8.9 mm and may be spaced apart any desired distance, including distances smaller than about 6.275 mm and larger than about 6.325 mm.

In the illustrated embodiments, the PEL mechanism 30 is disposed within the cavity 27 of the track assembly 20 between the lower and upper tracks 24 and 26. A portion of the PEL mechanism 30, such as shown in FIGS. 2 and 3, extends outwardly (upwardly when viewing FIGS. 2 through 7) through an opening 28 formed in the top plate 26C of the upper track 26. An advantage of this configuration is that the PEL mechanism 30 occupies a smaller volume of space than a conventional locking mechanism, in which most of the locking mechanism is located outside of the cavity 27.

FIGS. 4 and 5 are cross sectional elevational views of the seat track assembly 20. FIG. 4 illustrates a pin 106 urged outwardly through the first wall 26A1, the first wall 24A1, and the second wall 26B1 of the free play elimination pin side 20A to a maximum distance. On the free play elimination pin side 20A, the pins 106 function as free play elimination pins. FIG. 5 illustrates a pin 106 urged outwardly through the first wall 26A2, the first wall 24A2, and the second wall 26B2 of the locking pin side 20B a maximum distance. The pin 106 is also disposed at an angle A1 below a plane P. The plane P is substantially parallel with the base plate 24C. On the locking pin side 20B, the pins 106 function as locking pins.

In FIG. 4, the pins 106 are carried by the second or upper track 26 and are slidably movable between an engaged position, wherein each pin 106 extends through one of the plurality of openings 220 formed in the first wall 24A1 of the lower track 24 and one of the openings 218 formed in the second wall 26B1 of the upper track 26, and a disengaged position, wherein the pins 106 are retracted from the openings 220 and 218. Similarly, in FIG. 5, the pins 106 are carried by the upper track 26 and are slidably movable between an engaged position, such that the pins 106 extend through the openings 221 formed in the first wall 24A2 and the openings 219 formed in the second wall 24B2, and a disengaged position, such that the pins 106 are retracted from the openings 221 and 219.

As best shown in FIGS. 9 and 10, each of the pins 106 include a pin body 108 having a first or leading end 110 and a second or trailing end 112. The pin body 108 has a substantially rectangular transverse section. Parallel longitudinally extending shoulders 114 are formed in the pin body 108 and define a longitudinally extending upper portion 115 of the pin 106. An engagement member 116 extends upwardly from the upper portion 115 of the pin 106. The engagement member 116 includes spring face 118 having an outwardly extending, substantially cylindrical spring boss 120. An actuator face 122 is formed opposite the spring face 118. In the illustrated embodiment, the actuator face 122 has a rounded surface. The shape of the actuator face 122 corresponds to the shape of a portion of first and second actuators 40 and 42. Sides 124 of the pin 106 are tapered from about the engagement member 116 to the first end 110 at an angle A2. In the illustrated embodiment, the sides 124 are tapered at an angle of about 3 degrees. Alternatively, the sides 124 may be tapered at any desired angle. In the illustrated embodiment, the sides 124 may be tapered at an angle within the range of from about 2.97 degrees to about 3.03 degrees. The first end 110 includes a beveled end portion 128. The second end 112 of the pin 106 includes a transversely extending impact locking step 132, the purpose of which will be explained in detail below.

The illustrated PEL mechanism 30 includes a first housing portion 36 and a second housing portion 38, both shown in FIGS. 4 and 5. The illustrated PEL mechanism 30 also includes the first actuator 40 and the second actuator 42. The first and second housing portions 36 and 38, respectively, are mounted to a third housing portion or load bracket 44.

The first housing portion 36 includes a body 46 having an elongated pivot surface 48. In the illustrated embodiment, three spring guide posts 50 (a representative one of which is illustrated in FIG. 4) extend outwardly from an inner surface 52 of the body 46 (toward the right when viewing FIG. 4). Apertures 53 may be formed through the body 46 through which the pins 106 may extend.

Figure 6:
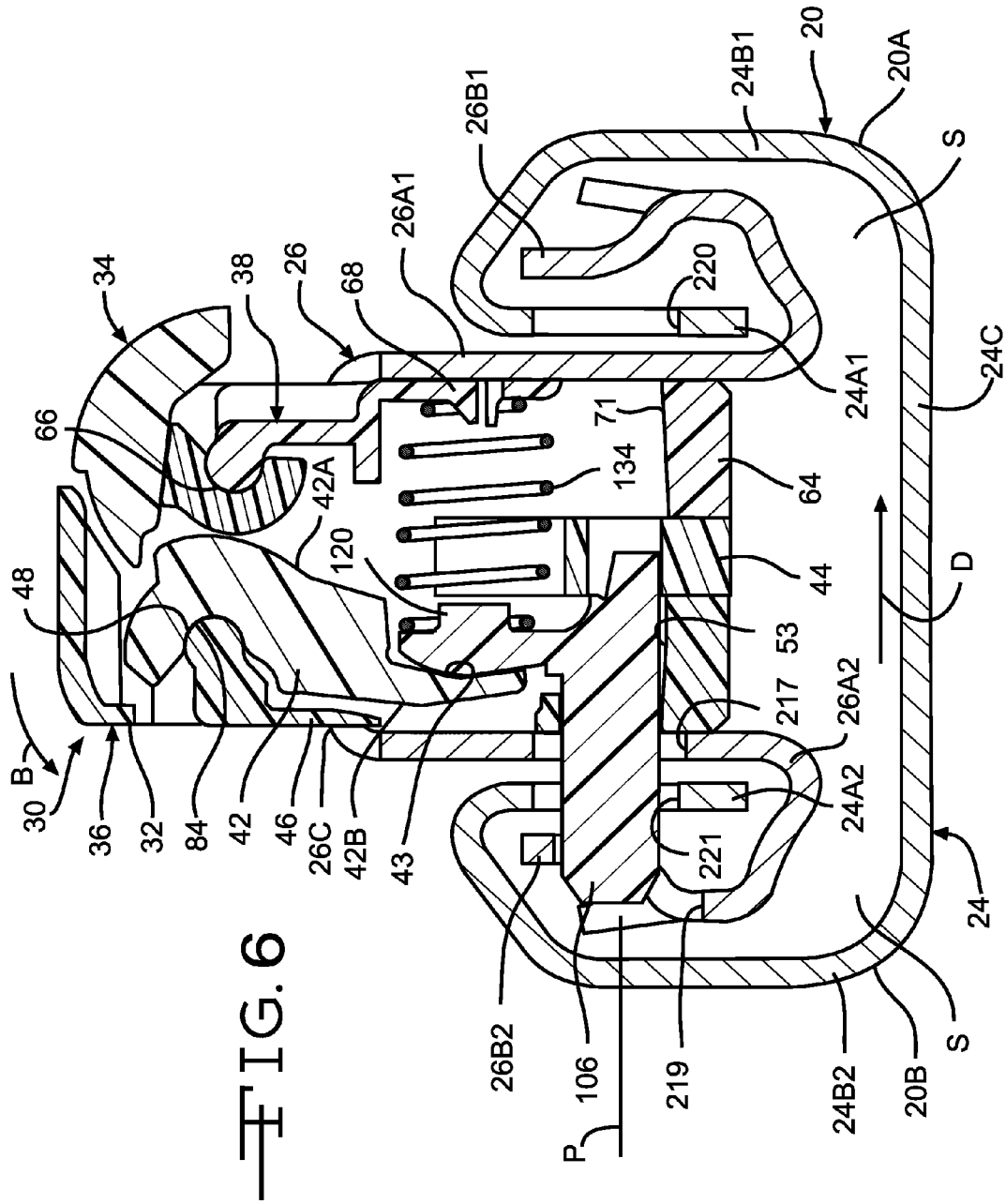
FIG. 6 is a cross sectional view similar to FIG. 5 showing the PEL in a substantially horizontal position.

The second housing portion 38 includes a body 64 having an elongated pivot surface 66. In the illustrated embodiment, three spring guide posts 68 (a representative one of which is illustrated in FIGS. 5, 6, and 7) extend outwardly from an inner surface 70 (generally toward the right when viewing FIGS. 5, 6, and 7). Apertures 71 may be formed through the body 64 through which the pins 106 may extend. Springs 134 extend between the spring guide posts 50 and 68 and the spring bosses 120 of the pins 106.

Figure 11:
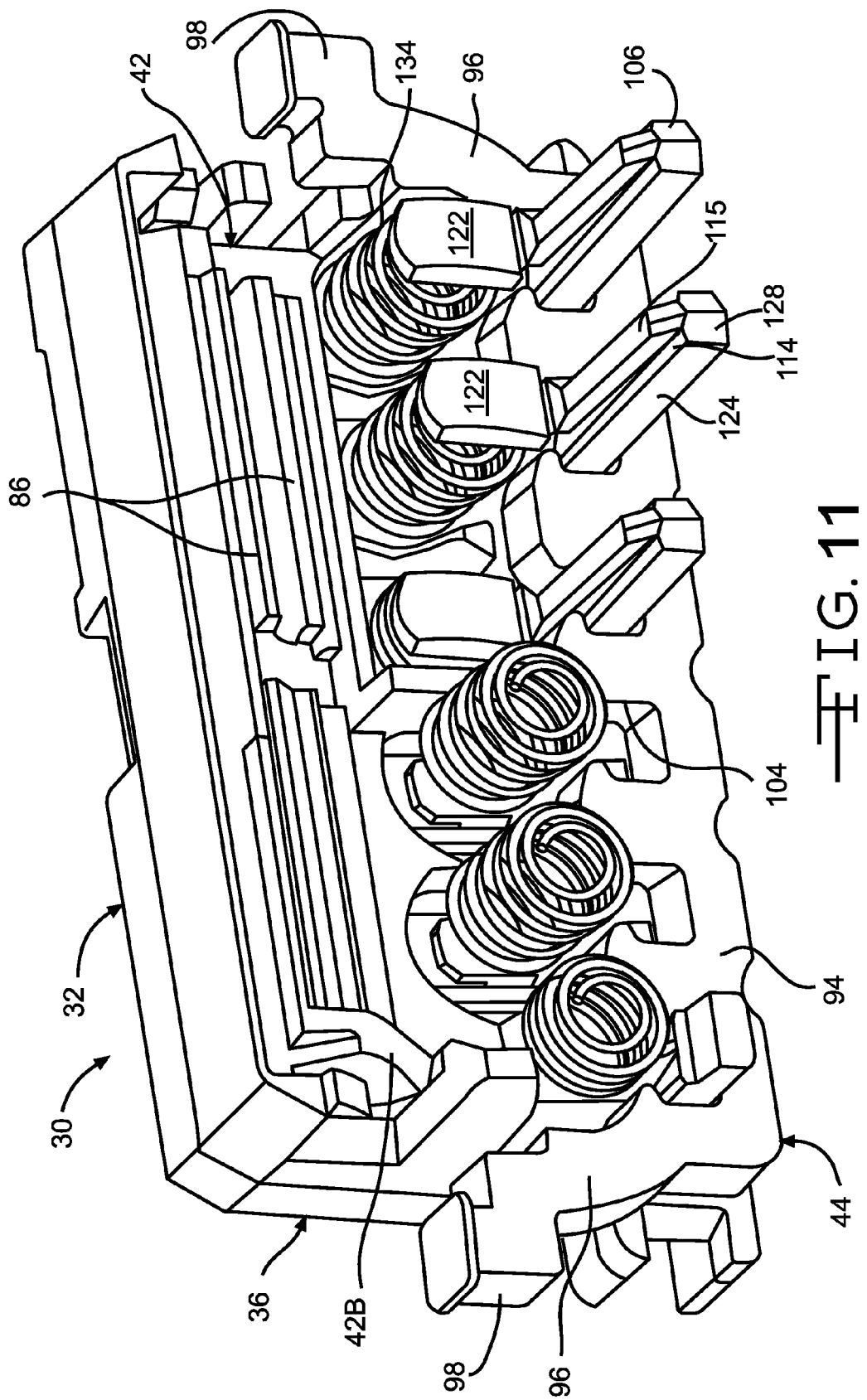
FIG. 11 is an enlarged perspective view of a first housing portion of the PEL illustrated in FIGS. 2 and 3.
Figure 12:
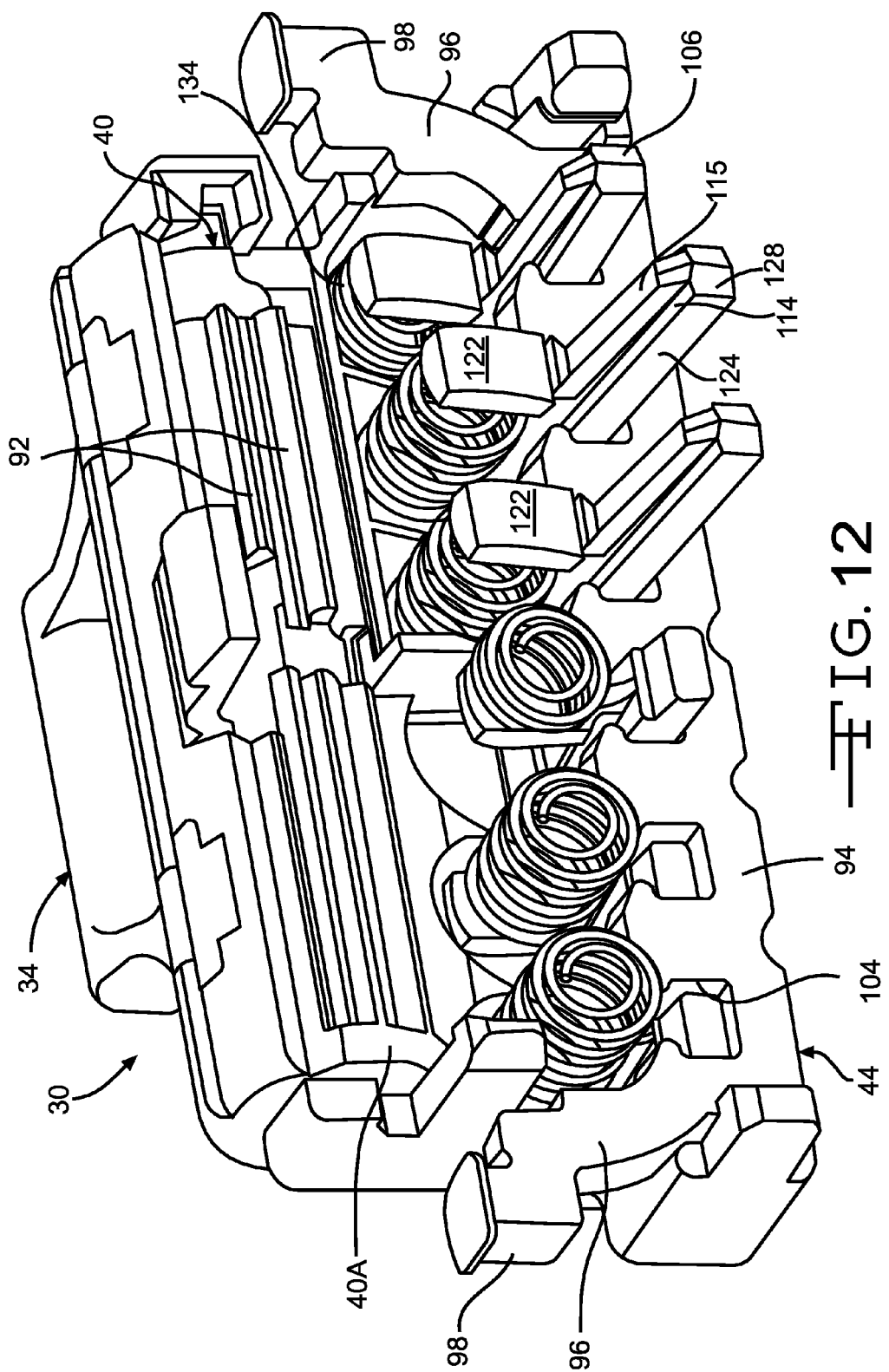
FIG. 12 is an enlarged perspective view of a second housing portion of the PEL illustrated in FIGS. 2 and 3.

FIG. 11 shows a first side 32 of the PEL mechanism 30 with the second housing portion 38 and the first actuator 40 removed. FIG. 12 shows a second side 34 of the PEL mechanism 30 with the first housing portion 36 and the second actuator 42 removed. In the illustrated embodiments, the coil springs 134 are mounted on the spring guide posts 50 and 68 to bias the pins 106 outward of the load bracket 44. The housing portions 36 and 38, actuators 40 and 42, load bracket 44, and pins 106 may be made of any suitable material, such as plastic. It will be understood that the PEL mechanism 30 further defines a sub-assembly of the seat track assembly 20.

As shown in FIGS. 11 and 12, the load bracket 44 includes an elongated generally U-shaped body 94 having outwardly extending arms 96 and a plurality of pin grooves 104. Attachment posts 98 extend outwardly toward the upper track 26 for attaching the load bracket 44 to the upper track 26.

The first housing portion 36, as shown in FIGS. 5 through 7 and 11, includes the second actuator 42. The second actuator 42 has a first or inboard facing side 42A. A second or outboard facing side 42B has a pivot groove 84 that pivotally engages the pivot surface 48. As best shown in FIG. 11, the second side 42B also includes a plurality of first teeth 86. The illustrated first housing portion 36 includes three second actuators 42, only one of which is illustrated in FIGS. 5 through 7.

The second housing portion 38, as shown in FIGS. 4 and 12, includes the first actuator 40. The first actuator 40 has a first or inboard facing side 40A. A second or outboard facing side 40B has the pivot groove 84 that pivotally engages the pivot surface 66. As best shown in FIG. 12, a second side 40B also includes a plurality of second teeth 92. The second teeth 92 of the first actuator 40 are intermeshed with the first teeth 86 of the second actuator 42 such that rotating movement of the first actuator 40 causes rotating movement of the second actuator 42, as described below. The illustrated second housing portion 38 includes three first actuators 40, only one of which is illustrated in FIG. 4.

The first actuators 40 further include a pin engagement surface 43. In the illustrated embodiment, the pin engagement surface 43 has a rounded, concave surface. In the illustrated embodiments, the shape of the pin engagement surface 43 corresponds to the shape of the actuator face 122 of the pin 106. The second actuators 42 are substantially identical to the first actuators 40 and will not be further described herein.

As described above, the free play elimination pin side 20A includes three pins 106, and the locking pin side 20B includes three pins 106. In operation, the seat mounting assembly 12 may be moved between a locked and an unlocked position. In the locked position, at least two of the pins 106 in the free play elimination pin side 20A and at least two of the pins 106 in the locking pin side 20B are in the engaged position, as shown in FIG. 8. In the unlocked position, all of the pins 106 on both the free play elimination pin side 20A and the locking pin side 20B are in the disengaged position.

When in the locked position, the seat mounting assembly 12 may be operated by moving the release handle 22 (upwardly when viewing FIG. 1). This movement moves the attached release handle portion 25, as best shown in FIG. 2, and rotates the pivot/mounting rod 15 and urges the release arm 19 into engagement with the second side 34 of the PEL mechanism 30, thereby actuating the PEL mechanism 30. This actuation of the PEL mechanism 30 causes the first actuator 40 to be rotated in the direction of the arrow A (clockwise when viewing FIG. 4). Because the second teeth 92 of the first actuator 40 are intermeshed with the first teeth 86 of the second actuator 42, the rotating movement of the first actuator 40 causes the second actuator 42 to rotate in the direction of the arrow B (counterclockwise when viewing FIGS. 5 through 7).

As best shown in FIG. 4, the pin engagement surface 43 of the first actuator 40 is urged against the actuator face 122 of the pins 106 on the free play elimination pin side 20A and urges the pins 106 inwardly (in the direction of the arrow C). This inward movement causes the pins 106 to disengage the second wall 26B1 and the first wall 24A1. Similarly, the pin engagement surface 43 of the second actuator 42 is urged against the actuator face 122 of the pins 106 on the locking pin side 20B and urges the pins 106 inwardly (in the direction of the arrow D). First, the pin 106 is caused to pivot to a substantially horizontal position wherein an axis of the pin 106 is substantially parallel to the plane P, as best shown in FIG. 6. Continued inward movement of the pins 106 parallel to the plane P and along an axis of travel (in the direction of the arrow D) causes the pins 106 to disengage the second wall 26B2 and the first wall 24A2. When the pins 106 on both the free play elimination pin side 20A and the locking pin side 20B are disengaged from the second walls 26B1 and 26B2, and the first walls 24A1 and 24A2, the upper track 26 can slide relative to the lower track 24.

In the embodiments illustrated herein, three pins 106 are provided on the free play elimination pin side 20A. After the release handle 22 is released by the seat occupant, two of the pins 106 on the free play elimination pin side 20A are urged outwardly by the springs 134 into positions engaging the walls 26A1, 24A1 and the load bracket 44, as best shown in FIG. 8. At least two of the pins 106, (the right-most pins 106 in the example shown in FIG. 8) will engage both the upper track 26 and the lower track 24. If an attempt is made to move the seat 16 either forwardly or rearwardly, at least two pins 106 will engage both the upper track 26 and the lower track 24, thereby substantially eliminating free-play.

In the embodiment illustrated in FIG. 8, the pins 106 on the free play elimination pin side 20A are urged outwardly a maximum distance through the walls 26A1, 24A1, and 26B1, such that a surface of each of two pins 106 engages the opening 220 of the wall 24A1 at areas of contact indicated within the circles 202 and 204, respectively, thereby urging the pins 106 slightly laterally outwardly (i.e., substantially perpendicularly to a longitudinal axis of the pins 106). The pins 106 are thereby urged slightly laterally into engagement with the openings 216 as indicated within the circles 222 and 224. In the illustrated embodiment, the two pins 106 that engage the upper track 26 and the lower track 24 also extend into the openings 218 in the wall 26B1, but do not engage the openings 218. The pins 106 that engage the upper track 26 and the lower track 24 further engage the grooves 104 of the load bracket 44 at contact areas indicated within the circles 226 and 228.

Advantageously, as shown in FIG. 8, each of the two outwardly extending pins 106 on the free play elimination pin side 20A engages the PEL mechanism 30 at three areas. Additionally, the longitudinal axes LA1 and LA2 of the pins 106 are not precisely parallel. The two outwardly extending pins 106 thus have three areas of contact with the PEL mechanism 30. The three areas of contact are indicated by the circles 202, 222, 226 and 204, 224, and 228, respectively. These areas of contact, combined with the positions of each pin 106 relative to the other, ensure that each pin 106 remains engaged at the three contact areas, thereby substantially eliminating free play of the seat track assembly 20.

As described above, actuation of the PEL mechanism 30 causes the first actuator 40 to be rotated in the direction of the arrow A (clockwise when viewing FIG. 4). Because the second teeth 92 of the first actuator 40 are intermeshed with the first teeth 86 of the second actuator 42, the rotating movement of the first actuator 40 causes the second actuator 42 to rotate in the direction of the arrow B (counterclockwise when viewing FIGS. 5 through 7).

After the release handle 22 is released by the seat occupant, two of the pins 106 on the locking pin side 20B are urged outwardly by the springs 134 and through the openings 217, 221, and 219 in each of the three walls 26A2, 24A2, and 26B2, respectively. The two outwardly extending pins 106 further secure the upper track 26 relative to the lower track 24 and prevent undesirable fore and aft movements of the seat track assembly 20 that may occur during an impact or crash event.

Prior to the release handle 22 being released, the pins 106 on the locking pin side 20B are moved inwardly to a disengaged position within the upper track 26 by the second actuator 42, as shown in FIG. 7. After the release handle 22 is released by the seat occupant, two of the pins 106 on the locking pin side 20B are urged outwardly by the springs 134 along the axis of travel and through the openings 217, 221, and 219 in each of the three walls 26A2, 24A2, and 26B2 respectively, as shown in FIG. 6.

Once the leading ends 110 of the pins 106 extend through the openings 219 in the second wall 26B2, the spring 134 continues to urge the pins 106 against the second actuators 42 until the second actuators 42 contact an inside surface of the first wall 26A2. The actuator faces 122 of the pins 106 slide against the pin engagement surfaces 43 of the second actuators 42, causing the leading ends 110 of the pins 106 to pivot downwardly until the pins 106 are disposed at the angle A1 below the plane P, as shown in FIG. 5. In this pivoted position, the pins 106 cannot be again moved inwardly (i.e., in the direction of the arrow D) until the release handle 22 is again moved upwardly and the PEL mechanism 30 is actuated, as described in detail above.

Alternatively, the seat track assembly 20 may be configured such that the leading ends 110 of the pins 106 will pivot upwardly until the pins 106 are disposed at an angle, such as the angle A1, above the plane P.

In an impact or crash event, a force may be exerted on the pins 106 in the direction of the arrow D. If the pins 106 were to be urged inwardly during the impact or crash event, the seat track assembly 20 may become unlocked, allowing undesirable fore and aft movements of the seat 10 relative to the floor 18.

Advantageously, two of the pins 106 on the locking pin side 20B are disposed at the angle A1 below the plane P when in the rotated and locked position. Because the pins 106 are disposed at the angle A1, they cannot easily be returned to a substantially horizontal position as shown in FIG. 6 and cannot easily be forced inwardly (in the direction of the arrow D). Additionally, the impact locking step 132 is structured such that when the locking pins 106 are in the rotated and locked position, the locking step 132 will contact an upper portion of the load bracket 44 if urged inwardly, such as during an impact or crash event, while in the rotated and locked position illustrated in FIG. 5. This contact between the locking step 132 and the upper portion of the load bracket 44 further ensures that the pins 106 cannot easily be forced inwardly (in the direction of the arrow D). The angled pins 106 (i.e., the pins 106 disposed at the angle A1) thus prevent undesirable fore and aft movements of the seat track assembly 20 that may otherwise occur during an impact or crash event in a seat track assembly that does not have the angled pins 106.

Additionally, the operation of the PEL mechanism 30 is split such that three pins 106 extend outwardly toward the free play elimination pin side 20A of the track assembly 20, and three pins 106 extend outwardly toward the locking pin side 20B opposite the free play elimination pin side 20A.

Because in the engaged position at least two pins 106 on the free play elimination pin side 20A and two pins 106 on the locking pin side 20B extend through openings in both walls of the upper track and the first wall of the lower track, load performance of the associated seat track assembly is improved during an impact or crash event.

Further, because the six pins 106 used in the PEL mechanism are identical, the cost of the PEL mechanism may be lower relative to a similar mechanism with two or more types of pins or other retaining structures.

The principle and mode of operation of the vehicle seat track assembly have been described in its preferred embodiment. However, it should be noted that the vehicle seat track assembly described herein may be practiced otherwise than as specifically illustrated and described without departing from its scope.

What is claimed is:

1. A seat track assembly comprising:
a first track having a wall including a plurality of openings formed therein;
a second track slidably mounted relative to the first track and having a wall including a plurality of openings formed therein; and
a locking mechanism including: a pin carried by the second track, wherein the pin is slidably movable within a substantially horizontal plane between an engaged position and a disengaged position, and pivotally movable between the engaged position and a locked position, wherein in the engaged position, the pin is disposed in one of the plurality of openings formed in the wall of the first track and in the locked position, the pin is pivoted to a position such that an axis of the pin is not parallel with the substantially horizontal plane, and
wherein in the disengaged position, the pin is not disposed in one of the plurality of openings formed in the wall of the first track.

2. The seat track assembly according to claim 1, wherein the pin includes a plurality of pins, two of which are carried by the second track and slidably movable along an axis of travel between an engaged position and a disengaged position, wherein in the engaged position, each of the two pins is disposed in one of the plurality of openings formed in the wall of the first track, and wherein each of the two pins is pivoted to a position such that an axis of each of the two pins is not parallel with the substantially horizontal plane.

3. The seat track assembly according to claim 2, wherein the plurality of pins define locking pins, the seat track assembly further including a free play elimination pin carried by the second track and slidably movable between an engaged position and a disengaged position, wherein in the engaged position, the free play elimination pin engages one of the plurality of openings formed in the wall of the first track, and wherein in the disengaged position, the free play elimination pin does not engage one of the plurality of openings formed in the wall of the first track.

4. The seat track assembly according to claim 3, further including a plurality of free play elimination pins, two of the plurality of free play elimination pins are carried by the second track and slidably movable between an engaged position and a disengaged position, wherein in the engaged position, each of the two free play elimination pins engages one of the plurality of openings formed in the wall of the second track.

5. The seat track assembly according to claim 3, wherein the plurality of pins and the free play elimination pin are movable in directions different from one another when moving into their respective engaged positions.

6. The seat track assembly according to claim 3, wherein in the engaged position, the free play elimination pin further engages the second track in one of the plurality of openings formed in the wall of the second track.

7. The seat track assembly according to claim 6, wherein the free play elimination pin is slidably mounted to a housing portion; and wherein in the engaged position, the free play elimination pin further engages the housing portion.

8. The seat track assembly according to claim 6 wherein the second track includes first and second spaced apart walls, the second wall being outboard of the first wall; and wherein the free play elimination pin engages the second track in one of the plurality of openings formed in the first wall of the second track.

9. The seat track assembly according to claim 8, wherein the free play elimination pin is further disposed in one of the plurality of openings formed in the second wall of the second track.

10. The seat track assembly according to claim 1, wherein the pin defines a locking pin, the seat track assembly further including a second pin carried by the second track and slidably movable between an engaged position and a disengaged position, wherein in the engaged position, the second pin engages one of the plurality of openings formed in the wall of the first track, and wherein in the disengaged position, the second pin does not engage one of the plurality of openings formed in the wall of the first track.

11. The seat track assembly according to claim 10, wherein the second pin includes a plurality of second pins, two of the plurality of second pins are carried by the second track and slidably movable between an engaged position and a disengaged position, wherein in the engaged position, each of the two second pins engages one of the plurality of openings formed in the wall of the first track.

12. The seat track assembly according to claim 10, wherein the locking pin and the second pin are movable in directions different from one another when moving into their respective engaged positions.

13. The seat track assembly according to claim 10, wherein the second pin defines a free play elimination pin.

14. The seat track assembly according to claim 10, wherein in the engaged position, the second pin further engages the second track in one of the plurality of openings formed in the wall of the second track.

15. The seat track assembly according to claim 14, wherein the second pin is slidably mounted to a housing portion; and wherein in the engaged position, the second pin further engages the housing portion.

16. The seat track assembly according to claim 14, wherein the second track includes first and second spaced apart walls, the second wall being outboard of the first wall; and wherein the second pin engages the second track in one of the plurality of openings formed in the first wall of the second track.

17. The seat track assembly according to claim 16, wherein the second pin is further disposed in one of the plurality of openings formed in the second wall of the second track.

18. The seat track assembly according to claim 16, wherein the locking pin is disposed in one of the plurality of openings formed in the first wall of the second track.

19. The seat track assembly according to claim 18, wherein the locking pin is further disposed in one of the plurality of openings formed in the second wall of the second track.

20. A seat track assembly comprising:
a first track having a wall including a plurality of openings formed therein;
a second track slidably mounted relative to the first track and having a wall including a plurality of openings formed therein; and
a locking mechanism including: a pin carried by the second track and slidably movable within a substantially horizontal plane between an engaged position and a disengaged position,
wherein in the engaged position, the pin is disposed in one of the plurality of openings formed in the wall of the first track and the pin is pivoted to a position such that an axis of the pin is not parallel with the substantially horizontal plane,
wherein in the disengaged position, the pin is not disposed in one of the plurality of openings formed in the wall of the first track,
wherein the pin defines a locking pin, the seat track assembly further including a second pin carried by the second track and slidably movable between an engaged position and a disengaged position,
wherein in the engaged position, the second pin engages one of the plurality of openings formed in the wall of the first track,
wherein in the disengaged position, the second pin does not engage one of the plurality of openings formed in the wall of the first track,
wherein the second pin is slidably mounted to a housing portion, and
wherein in the engaged position, the second pin further engages the housing portion.

21. A seat track assembly comprising:
a first track having a wall including a plurality of openings formed therein;
a second track slidably mounted relative to the first track and having a wall including a plurality of openings formed therein; and
a locking mechanism including: a plurality of pins, two of the plurality of pins are carried by the second track and slidably movable within a substantially horizontal plane between an engaged position and a disengaged position,
wherein in the engaged position, each of the two pins is disposed in one of the plurality of openings formed in the wall of the first track,
wherein each of the two pins is pivoted to a position such that an axis of each of the two pins is not parallel with the substantially horizontal plane,
wherein in the disengaged position, the two pins are not disposed in the plurality of openings formed in the wall of the first track,
wherein the plurality of pins define locking pins, the seat track assembly further including a free play elimination pin carried by the second track and slidably movable between an engaged position and a disengaged position,
wherein in the engaged position, the free play elimination pin engages one of the plurality of openings formed in the wall of the first track, and wherein in the disengaged position, the free play elimination pin does not engage one of the plurality of openings formed in the wall of the first track,
wherein the free play elimination pin is slidably mounted to a housing portion, and
wherein in the engaged position, the free play elimination pin further engages the housing portion.

* * * * *